(12) United States Patent
Hooda et al.

(10) Patent No.: US 10,693,733 B2
(45) Date of Patent: Jun. 23, 2020

(54) HORIZONTAL SCALING OF FABRIC NETWORKS

(71) Applicant: Cisco Technology, Inc., San Jose, CA (US)

(72) Inventors: Sanjay Hooda, Pleasanton, CA (US); Johnson Leong, Sunnyvale, CA (US); Satish Kondalam, Milpitas, CA (US); Victor Moreno, Carlsbad, CA (US); Rohan Grover, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 53 days.

(21) Appl. No.: 15/912,839

(22) Filed: Mar. 6, 2018

(65) Prior Publication Data

US 2019/0132209 A1 May 2, 2019

Related U.S. Application Data

(60) Provisional application No. 62/578,116, filed on Oct. 27, 2017.

(51) Int. Cl.
| H04L 12/24 | (2006.01) |
| H04L 29/12 | (2006.01) |
| H04L 12/947 | (2013.01) |
| H04L 12/931 | (2013.01) |

(52) U.S. Cl.
CPC .............. *H04L 41/12* (2013.01); *H04L 49/25* (2013.01); *H04L 49/70* (2013.01); *H04L 61/2007* (2013.01); *H04L 61/103* (2013.01); *H04L 61/2084* (2013.01); *H04L 61/6022* (2013.01)

(58) Field of Classification Search
CPC ...... H04L 41/12; H04L 49/25; H04L 61/2007
See application file for complete search history.

(56) References Cited

U.S. PATENT DOCUMENTS

| 7,848,245 B1* | 12/2010 | Krishnamurthy ... H04L 43/0817 370/244 |
| 2003/0016678 A1* | 1/2003 | Maeno .................... H04L 45/10 370/400 |
| 2011/0271007 A1* | 11/2011 | Wang .................... H04L 45/306 709/238 |
| 2012/0051589 A1* | 3/2012 | Schloegel ................. G06T 7/20 382/103 |
| 2014/0295806 A1* | 10/2014 | Frager ................... H04L 61/106 455/414.1 |
| 2014/0310390 A1* | 10/2014 | Sorenson, III .......... H04L 47/10 709/223 |
| 2016/0182380 A1* | 6/2016 | Mehra ................... H04L 47/125 |
| 2016/0377442 A1* | 12/2016 | Ye ...................... G01C 21/3446 701/533 |

* cited by examiner

*Primary Examiner* — Jianye Wu
(74) *Attorney, Agent, or Firm* — Merchant & Gould P.C.

(57) ABSTRACT

A method for establishing a partitioned fabric network is described. The method includes establishing a fabric network including a plurality of border nodes to couple the fabric network to one or more external data networks and a plurality of edge nodes to couple to the fabric network to one or more hosts. The method further includes defining a plurality of partitions of the fabric network. The method further includes registering each of the plurality of partitions with a corresponding one of the plurality of border nodes and with each of the plurality of edge nodes.

20 Claims, 7 Drawing Sheets

HORIZONTAL SCALING OF FABRIC NETWORKS

CROSS-REFERENCE TO RELATED APPLICATIONS

This application claims priority to U.S. Provisional Patent App. No. 62/578,116, filed Oct. 27, 2017, and hereby incorporated by reference in its entirety.

TECHNICAL FIELD

The present disclosure relates generally to wired or wireless networks, and in particular, partitioned fabric networks.

BACKGROUND

The ongoing development, maintenance, and expansion of fabric networks involve an increasing number of hosts, such as endpoint devices. Scaling network topologies and technologies to support a large number of hosts presents a number of difficulties. For example, it can be challenging to store information, such as location, about each of the hosts at each of multiple map-servers/fabric control planes of a fabric network. Such a challenge may be further exacerbated when Layer-2 extensions are used as it may be difficult, if not impossible, to summarize MAC (media access control) addresses.

BRIEF DESCRIPTIONS OF THE DRAWINGS

For a better understanding of aspects of the various implementations described herein and to show more clearly how they may be carried into effect, reference is made, by way of example only, to the accompanying drawings.

Figure 1:
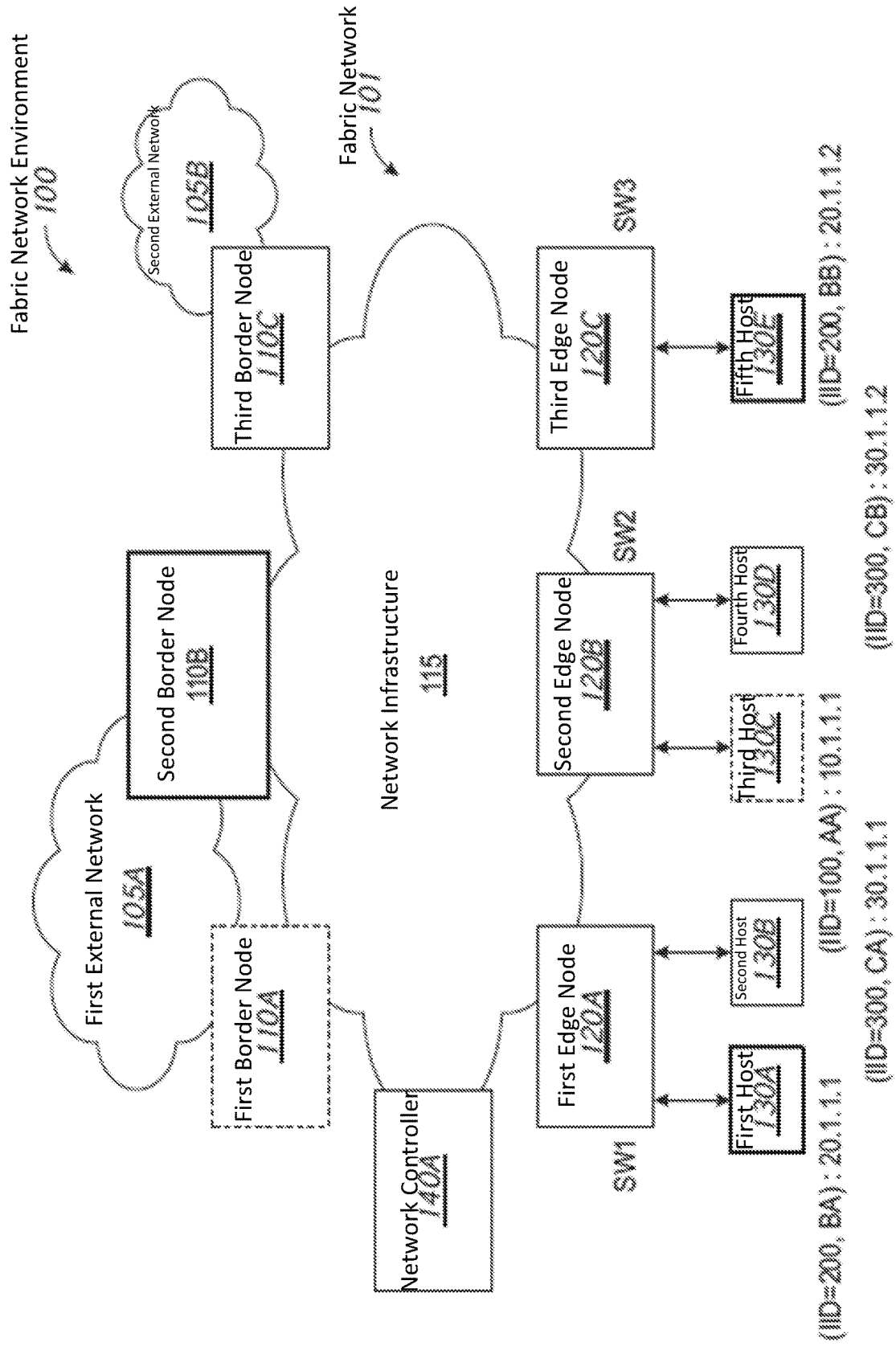
FIG. 1 illustrates a fabric network environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for establishing a partitioned fabric network. The method includes establishing a fabric network including a plurality of border nodes to couple the fabric network to one or more external data networks and a plurality of edge nodes to couple to the fabric network to one or more hosts. The method further includes defining a plurality of partitions of the fabric network. The method further includes registering each of the plurality of partitions with a corresponding one of the plurality of border nodes and with each of the plurality of edge nodes.

Implementations also disclosed herein include apparatuses, systems, and methods for transmitting data between two hosts through a partitioned fabric network. The method includes receiving, at a first edge node of a fabric network, data from a first host addressed to a second host. The method includes selecting a border node of the fabric network that is associated with the second host. The method includes sending, from the first edge node to the selected border node, a map-request for the second host and receiving, at the first edge node in response to the map-request, an indication of a second edge node associated with the second host. The method further includes sending, from the first edge node to the second edge node, the data from the first host addressed to the second host.

Implementations also disclosed herein include apparatuses, systems, and methods for updating a map in response to detecting a host has moved in accordance with some implementations. The method includes detecting, at a first edge node of a fabric network, association by a first host. The method further includes selecting a border node of the fabric network that is associated with the first host. The method further includes sending, to the selected border node, a map-update request to update a map for the first host to point to the first edge node.

Example Embodiments

A fabric network includes a large number of interconnected nodes. The nodes include border nodes that couple to one or more external networks, which can include any wired or wireless network, such as a public or private LAN (local area network) and/or WAN (wide area network), such as an intranet, an extranet, a virtual private network, and/or portions of the Internet. The nodes include edge nodes that couple to one or more hosts, which can include other networks, wireless access points, and/or endpoint devices, such as computers, smartphones, tablets, or other electronic devices. The nodes includes intermediate nodes that couple the border nodes to the edge nodes.

In various implementations, LISP (Locator/ID Separation Protocol) specifies that all the hosts coupled to the fabric network be registered with all the map-servers of the fabric network. However, this requirement, constrains the upper bound of the size of a fabric network (e.g., the number of hosts the fabric network can support).

Accordingly, in various implementations as described herein, a fabric network is horizontally partitioned to allow horizontal scaling of the fabric network to support a large number of hosts.

FIG. 1 illustrates a fabric network environment 100 in accordance with some implementations. The fabric network environment 100 includes a fabric network 101 coupled to one or more external networks 105A-105B and one or more hosts 130A-130E. The fabric network 101 includes a plurality of border nodes 110A-110C coupled to the one or more external networks 105A-105B. In various implementations, the border nodes 110A-110C connect the fabric network 101 to traditional Layer-3 networks or other fabric networks (which could be of the same or different type). Accordingly, in various implementations, the border nodes 110A-110C admit, encapsulate/decapsulate, and forward traffic to and from the external networks 105A-105B connected to the border nodes 110A-110C. In the fabric network environment 100 of FIG. 1, the fabric network 101 includes a first border node 110A coupled to a first external network 105A, a second border node 110B coupled to the first external network 105A, and a third border node 110C coupled to a second external network 105B. In various implementations, one or more of the border nodes 110A-110C includes a border pair (e.g. a pair of servers or routers acting as a single unit). The border pair can include, for example, a first device that routes traffic to and from the border node and a control plane device that performs control plane functionality.

The fabric network 101 further includes a plurality of edge nodes 120A-120C coupled to the one or more hosts 130A-130E. In various implementations, one or more of the hosts 130A-130E includes a Layer-2 network, a wireless access point, or endpoint device connected to a respective edge node 120A-120C. In various implementations, the edge nodes 120A-120C admit, encapsulate/decapsulate, and forward traffic to and from the hosts 130A-130E connected to the edge nodes 120A-120C. Although the hosts 130A-130E of FIG. 1 are illustrated as directly attached to respective edge nodes 120A-120C, it is to be appreciated that, in some embodiments, one or more of the hosts 130A-130E are coupled to their respective edge nodes 120A-120C via an intermediate Layer-2 network that lies outside the fabric network 101. In the fabric network environment 100 of FIG. 1, the fabric network 101 includes a first edge node 120A (having an edge node identifier of "SW1") coupled to a first host 130A and a second host 130B, a second edge node 120B (having an edge node identifier of "SW2") coupled to a third host 130C and a fourth host 130D, and a third edge node 120C (having an edge node identifier of "SW3") coupled to a fifth host 130E. In various implementations, one or more of the edge nodes 120A-120C includes a switch or router.

The fabric network 101 further includes a network infrastructure 115 including one or more interconnected intermediate nodes (e.g., switches or routers) that couple the border nodes 110A-110C to the edge nodes 120A-120C. In various implementations, the intermediate nodes provide the Layer-3 underlay transport service to fabric traffic. Thus, the intermediate nodes are Layer-3 forwarders that connect the edge nodes 120A-120C and border nodes 110A-110C. In some embodiments, the intermediate nodes may be capable of inspecting the fabric metadata and could apply policies based on the fabric metadata. However, in various implementations, all policy enforcement is performed by the edge nodes 120A-120C and border nodes 110A-110C.

Accordingly, in various implementations, the fabric network 101 implements a network topology where data traffic is passed through interconnecting switches, while providing the abstraction of a single Layer-2 and/or Layer-3 device. In various implementations, the fabric network 101 uses IPoverlay, which makes the fabric network 101 appear like a single virtual router/switch without the use of clustering technologies. In various implementations, the fabric network 101 provides seamless connectivity, independent of physical topology, with policy application and enforcement at the edges of the fabric (e.g., at the edge nodes 120A-120C and/or border nodes 110A-110C).

The fabric network 101 further includes a network controller 140 which, among other things, establishes and manages the fabric network 101, including policy definition.

In various implementations, each border node 110A-110C acts as a map-server and stores a map that indicates which of the edge nodes 120A-120C each host 130A-130E is coupled to. For example, the map can include a table (e.g., a map-cache) that includes an entry for each host 130A-130E of the fabric network 101, each entry including a host identifier (e.g., an EID [endpoint identifier]) for the host and an edge node identifier (e.g., an RLOC [routing locator]) of the edge node that the host is connected to.

In various implementations, LISP (Locator/ID Separation Protocol) specifies that all the hosts 130A-130E within the fabric network 101 be registered with all the map-servers deployed within the fabric network 101 (e.g., all the border nodes 110A-110C). For example, to enable fast traffic convergence and backup path should TCAM (Ternary Content Addressable Memory) be depleted on the edge nodes 130A-130E, in various implementations, each border node 110A-110C supports all the hosts 130A-130E within the fabric network. However, this may constrain the upper bound of the size of the fabric network 101.

Accordingly, in various implementations, to overcome this constraint, the fabric network 101 is partitioned (e.g., by the network controller 140) to enable horizontally scaling of the map-server functionality of the border nodes 110A-110C. For example, in various implementations, the fabric network 101 is partitioned into smaller Layer-2 segments and/or IP subnets (e.g., Layer-2 segments for non-IP traffic and IP subnets for the IP traffic) such that each of the border nodes 110A-110C handles fabric control plane functions (e.g., EID registrations and map-resolutions when LISP is the control plane) within a corresponding partition (e.g., a Layer-2 segment having an instance identifier [IID] and/or an IP subnet having an IP network address).

In some embodiments, the number of hosts (e.g., the size) of a particular partition is proportional to the capacity of the border node, such that the border node can service all the host traffic within the particular partition. As some nodes can support up to 200,000 endpoints, having five such nodes as border nodes in a fabric network can support one million endpoints in the fabric network 101. Thus, the fabric network 101 can be horizontally scaled by increasing the number of border nodes.

Figure 2:
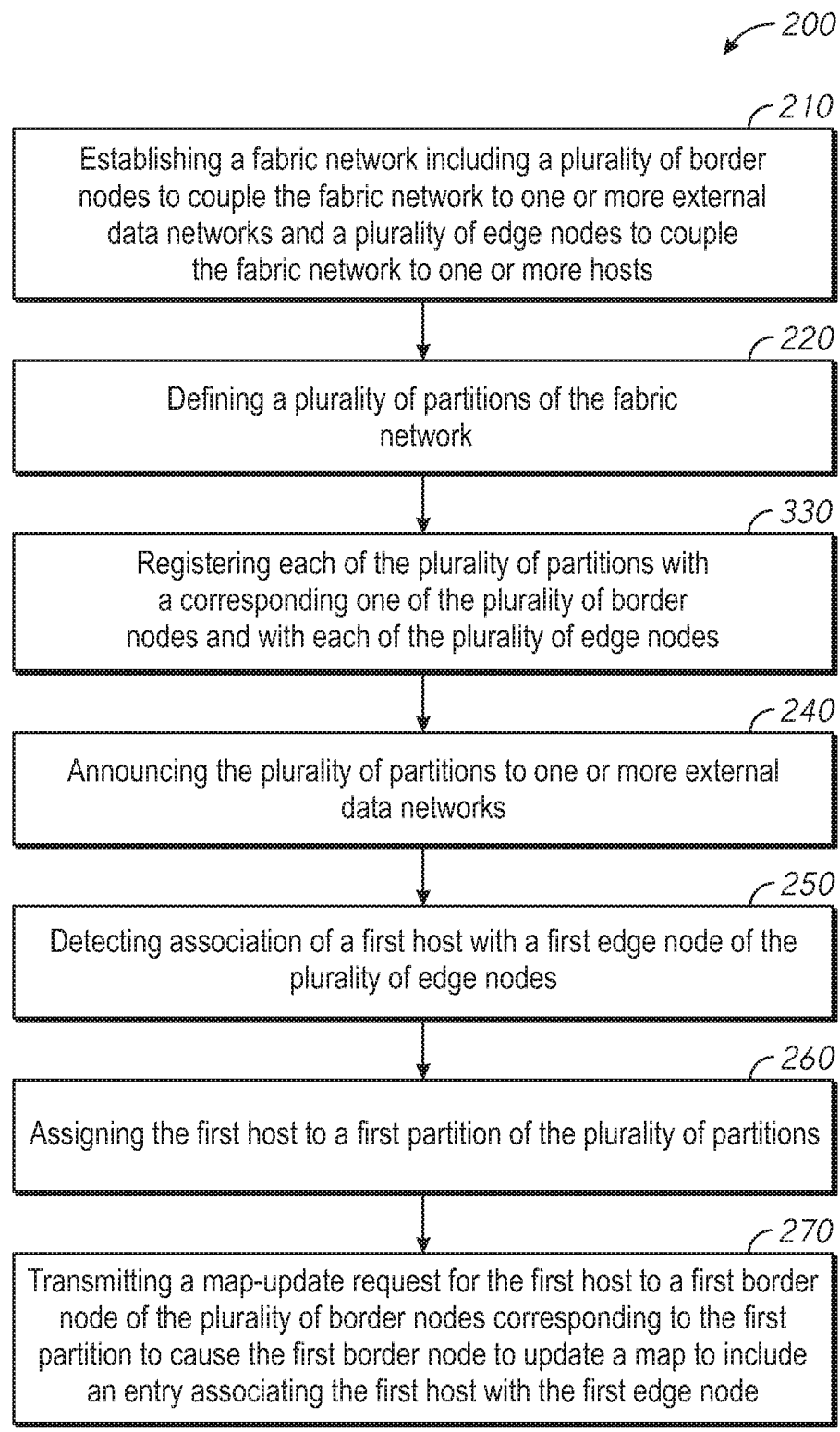
FIG. 2 is a flowchart representation of a method of establishing a partitioned fabric network in accordance with some implementations.

FIG. 2 is a flowchart representation of a method 200 of establishing a partitioned fabric network in accordance with some implementations. In some implementations (and as detailed below as an example), the method 200 is performed by network controller, such as the network controller 140 of FIG. 1, or a portion thereof. In some implementations, the method 200 is performed by processing logic, including hardware, firmware, software, or a combination thereof. In some implementations, the method 200 is performed by a processor executing code stored in a non-transitory computer-readable medium (e.g., a memory). Briefly, the method 200 includes establishing a fabric network, defining a plurality of partitions of the fabric network, and registering the partitions with corresponding ones of a plurality of border nodes and each of a plurality of edge nodes.

The method 200 begins, in block 210, with a network controller establishing a fabric network including a plurality of border nodes to couple the fabric network to one or more external data networks and a plurality of edge nodes to couple the fabric network to one or more hosts.

The method 200 continues, at block 220, with the network controller defining a plurality of partitions of the fabric network. In various implementations, the network controller defines each partition by defining a Layer-2 segment having an IID and/or an IP subnet having an IP network address. Thus, each partition is at least partially defined by a non-overlapping address space. Further, in various implementations, each partition is at least partially defined by a separate control plane. In various implementations, the number of the plurality of partitions is chosen by the network controller to be the same as the number of the plurality of border nodes.

The method 200 continues, at block 230, with the network controller registering each of the plurality of partitions with a corresponding one of the plurality of border nodes and with each of the plurality of edge nodes. Accordingly, each of the border nodes only stores information regarding a single partition (and corresponding control plane), limiting the amount of data stored by each border node in order to act as a map-server and/or perform other control plane functions. In contrast, each of the plurality of edge nodes stores information regarding each partition in order to transmit data through the fabric network. Thus, Layer-2 works across the fabric network and Layer-2 hosts can be connected to any of the edge nodes. Further, by partitioning the fabric network and registering the border nodes and edge nodes as described above, processing (such as control plane functionality) is split as each partition can be serviced by different processing and memory resources.

The method 200 continues, at block 240, with the network controller announcing the plurality of partitions to one or more external data networks. In various implementations, the network controller instructs each of the plurality of border nodes to announce (or advertise) the corresponding one of the plurality of partitions to the one or more external data networks.

The method 200 continues, at block 250, with the network controller detecting association of a first host with a first edge node of the plurality of edge nodes. In various implementations, the first edge node receives an association request from the first host and, in response, associates the first host with the first edge node, sends an association response to the first host, and sends an association notification to the network controller.

The method 200 continues, at block 260, with the network controller assigning the first host to a first partition of the plurality of partitions. In various implementations, the network controller assigns hosts to corresponding partitions randomly, in round-robin fashion, and/or according to policy heuristics.

The method 200 continues, at block 270, with the network controller transmitting a map-update request for the first host to a first border node of the plurality of border nodes corresponding to the first partition to cause the first border node to update a map to include an entry associating the first host with the first edge node. In various implementations, the entry includes an endpoint identifier (EID) of the first host and a resource locator (RLOC) of the first edge node. In various implementations, the map only includes entries for hosts assigned to the first partition.

Following the method 200 of FIG. 2, with reference to the fabric network environment 100 of FIG. 1, the network controller 140, at block 210, establishes the fabric network 101 including a plurality of border nodes 110A-110C to couple the fabric network 101 to one or more external data networks 105A-105B and a plurality of edge nodes to couple the fabric network 101 to one or more hosts 130A-130E.

At block 220, the network controller 140 defines a plurality of partitions of the fabric network 101. In particular, the network controller 140 defines a fabric control plane for each border node 110A-110C. Accordingly, as there are three border nodes 110A-110C in FIG. 1, the network controller 140 defines three control planes. In various implementations, each fabric control plane is associated with one or more control plane identifiers, such as an IP network address and/or a Layer-2 IID.

At block 230, the network controller 140 registers each of the plurality of partitions with a corresponding one of the plurality of border nodes 110A-110C and with each of the plurality of edge nodes 120A-120C. In various implementations, the network controller 140 points (e.g., using LISP commands) each border node 110A-110C to a corresponding control plane and points each edge node 120A-120C to each of the control planes.

For example, the first border node 110A is pointed to a first control plane for a first partition with an IID of 100 and an IP network address of 10.1.1.0/24, the second border node 110B is pointed to a second control plane for a second partition with an IID of 200 and an IP network address of 20.1.1.0/24, the third border node 110C is pointed to a third control plane for a third partition with an IID of 300 and an IP network address of 30.1.1.0/24, and each of the edge nodes 120A-120C is pointed to each of the three control planes.

At block 240, the plurality of partitions are announced (as networks) to the external networks 105A-105B. In various implementations, the first border node 110A announces the first partition to the first external network 105A, the second border node 110B announces the second partition to the first external network 105A, and the third border node 110C announces the third partition to the second external network 105B.

At blocks 250 and 260, as each host 130A-130E registers with its corresponding edge node 120A-120C, the network controller 140 assigns the host to one of the partitions (and assigns the host an EID). In various implementations, the hosts 130A-130E are each assigned to the corresponding partition randomly, in a round-robin fashion, based on policy, or by any other method. In FIG. 1, the third host 130C (along with the first border node 110A) is assigned to the first partition (and assigned an EID of "(IID=100, AA):10.1.1.1"), the first host 130A and the fifth host 130E (along with the second border node 110B) are assigned to the second partition (and respectively assigned EIDs of "(IID=200, BA):20.1.1.1" and "(IID=200, BB):20.1.1.2"), and the second host 130B and the fourth host 130D (along with the third border node 110C) are assigned to the third partition (and respectively assigned EIDs of "(IID=300, CA):30.1.1.1" and "(IID=300, CB):30.1.1.2").

Each border node 110A-110C serves as a map-server for its corresponding partition (and does not serve as a map-server for other partitions). Thus, following block 270, the first border node 110A includes a map (an example of which is shown in Table 1) that identifies the edge node that the third host 130C is connected to (e.g., the second edge node 120), the second border node 110B includes a map (an example of which is shown in Table 2) that identifies the edge node that the first host 130A is connected to (e.g., the first edge node 120A) and the edge node that that the fifth host 130E is connected to (e.g., the third edge node 120C), and the third border node 110C includes a map (an example of which is shown in Table 3) that identifies the edge node that the second host 130B is connected to (e.g., the first edge node 120A) and the edge node that the fourth host 130D is connected to (e.g., the second edge node 120B).

TABLE 1

| EID | RLOC |
|---|---|
| (IID = 100, AA):10.1.1.1 | SW2 |

TABLE 2

| EID | RLOC |
|---|---|
| (IID = 200, BA):20.1.1.1 | SW1 |
| (IID = 200, BB):20.1.1.2 | SW3 |

TABLE 3

| EID | RLOC |
|---|---|
| (IID = 300, CA):30.1.1.1 | SW1 |
| (IID = 300, CB):30.1.1.2 | SW2 |

Accordingly, FIG. 1 illustrates a fabric network 101 including a first plurality of border nodes respectively coupled to one or more external data networks, and a second plurality of edge nodes respectively coupled to one or more hosts, wherein each of the first plurality of border nodes are associated with a respective one of a plurality of control planes and each of the second plurality of edge nodes are associated with each of the plurality of control planes.

Figure 3:
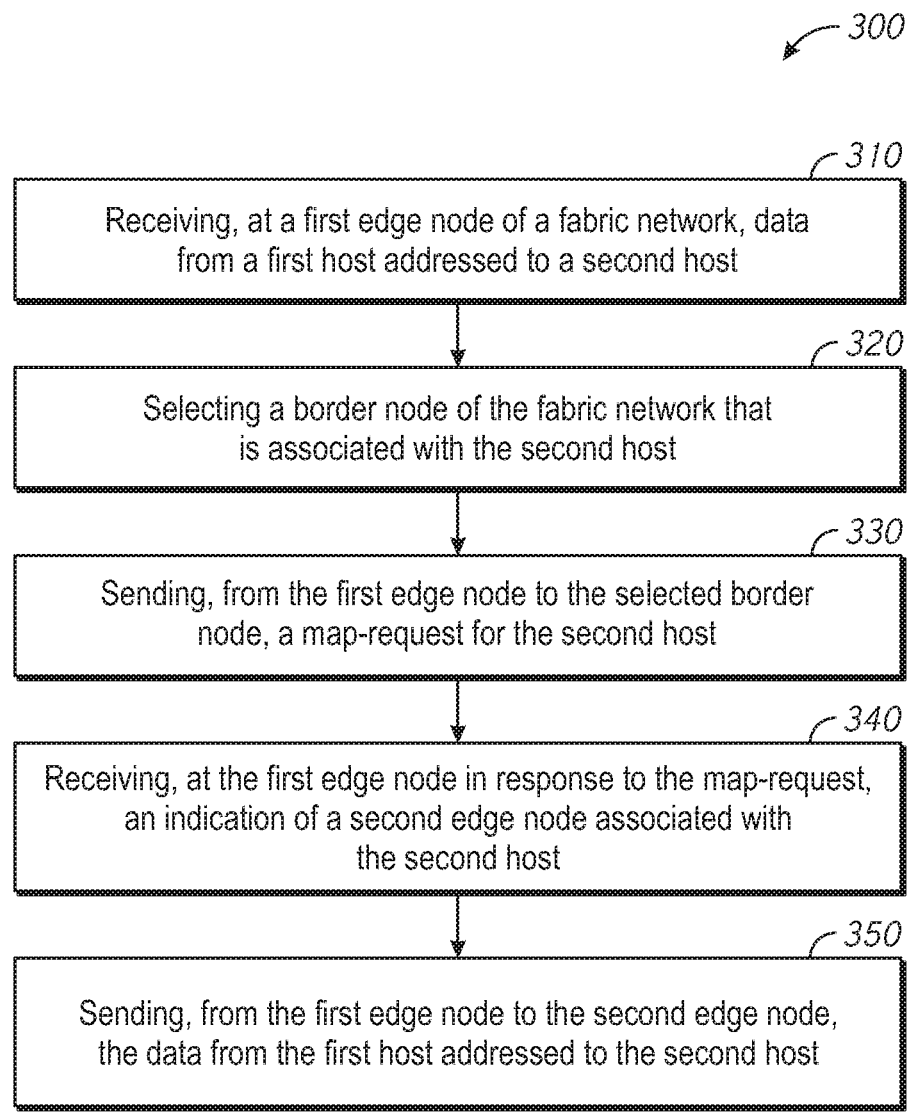
FIG. 3 is a flowchart representation of a method of transmitting data between two hosts through a partitioned fabric network in accordance with some implementations.

FIG. 3 is a flowchart representation of a method 300 of transmitting data between two hosts through a partitioned fabric network in accordance with some implementations. In some implementations (and as detailed below as an example), the method 300 is performed by an edge node of the fabric network, such as one of the edge nodes 120A-120C of FIG. 1, or a portion thereof. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, the method 300 includes receiving data from a first host addressed to a second host, querying a border node corresponding to a partition of the second host to determine the second host's location, and forwarding the data to that location.

The method 300 begins, in block 310, with a first edge node of a fabric network receiving data from a first host addressed to a second host. In various implementations, the first host includes a Layer-2 network, a wireless access point, or an endpoint device. In various implementations, the data is addressed to the second host in a variety of ways. For example, in some embodiments, the data includes an endpoint identifier (EID) of the second host embedded in a header of the data.

The method 300 continues, in block 320, with the first edge node selecting a border node of the fabric network that is associated with the second host. In various implementations, the first edge node determines a partition associated with the second host, e.g., the partition to which the second host is assigned, and selects the border node of the fabric network that is associated with the partition (e.g., the border node that provides map-server functionality for that partition). In order to determine the partition associated with the second host, in some embodiments, the first edge node inspects an endpoint identifier (EID) of the second host included in the data from the first host and determines the partition based on the EID. In various implementations, this includes parsing the EID to determine the partition. In one embodiment, the EID includes an instance identifier (IID) that identifies a Layer-2 subnet. In one embodiment, the EID includes an IP address having a portion that identifies an IP subnet. For example, the EID may be "(IID=300, CB): 30.1.1.2" and the first edge node may determine the Layer-2 subnet as that with the IID of 300 and/or the IP subnet as that with the IP network address of 30.1.1.0/24.

The method 300 continues, at block 330, with the first edge node sending, from the first edge node to the selected border node (through the fabric network), a map-request for the second host. In various implementations, the map-request includes the EID. In response to receiving the map-request for the second host, the border node checks a map to determine which edge node the second host is connected to. In various implementations, the map includes entries only for those hosts associated with the partition. In response to the map-request, the border node sends a map-response indicating the edge node that the second host is connected to. Accordingly, the method 300 continues, at block 340, with the first edge node receiving, in response to the map-request, an indication of a second edge node (e.g., an edge node identifier, such as an RLOC) associated with the second host.

The method 300 continues, at block 350, with the first edge node sending, from the first edge node to the second edge node (through the fabric network), the data from the first host addressed to the second host. Upon receiving the data, the second edge node forwards the data to the second host.

Following the method 300 of FIG. 3, with reference to the fabric network environment 100 of FIG. 1, should the first host 130A wish to send data to the fourth host 130D, the following occurs. At block 310, the first edge node 120A receives data from the first host 130A addressed to the fourth host 130D. At block 320, the first edge node 120A selects the border node that is associated with the fourth host 130D (e.g., the third border node 110C). At block 330, the first edge node 120A sends a map-request for the fourth host 130D to the third border node 110C. At block 340, the first edge node 120A receives an indication of the edge node to which the fourth host 130D is connected (e.g., the second edge node 120B). At block 350, the first edge node 120A sends the data to the second edge node 120B, which forwards the data to the fourth host 130D.

Figure 4:
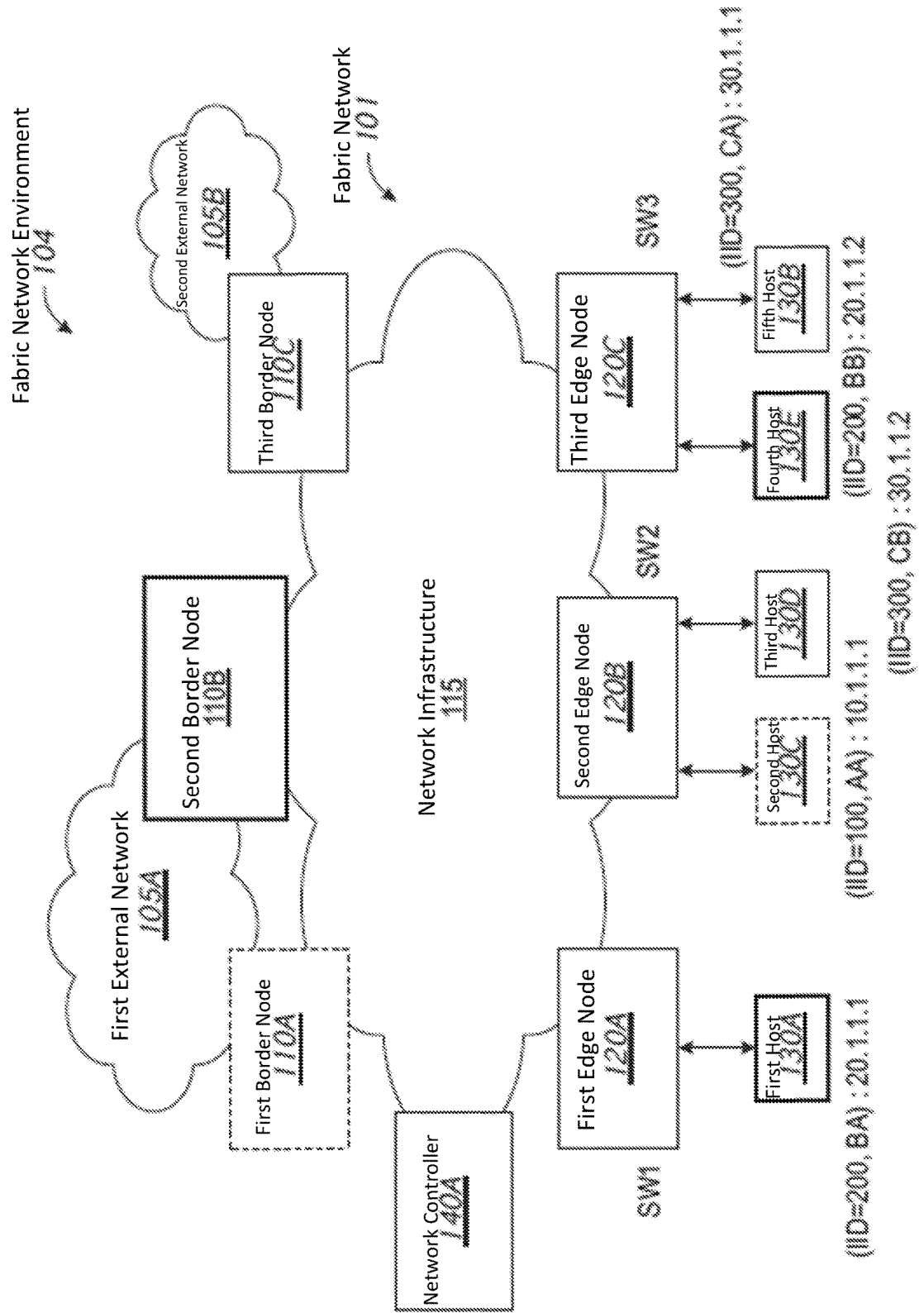
FIG. 4 illustrates the fabric network of FIG. 1 with one of the hosts moved to another location.

FIG. 4 illustrates the fabric network 101 of FIG. 1 with one of the hosts moved to another location. Accordingly, FIG. 4 illustrates a fabric network environment 104 including the elements of the fabric network environment 100 of FIG. 1, with the second host 130B coupled to the third edge node 120C (rather than the first edge node 120A as in FIG. 1). Accordingly, the second host 130B has left the coverage area of the first edge node 120A and entered the coverage area of the second edge node 120C.

Figure 5:
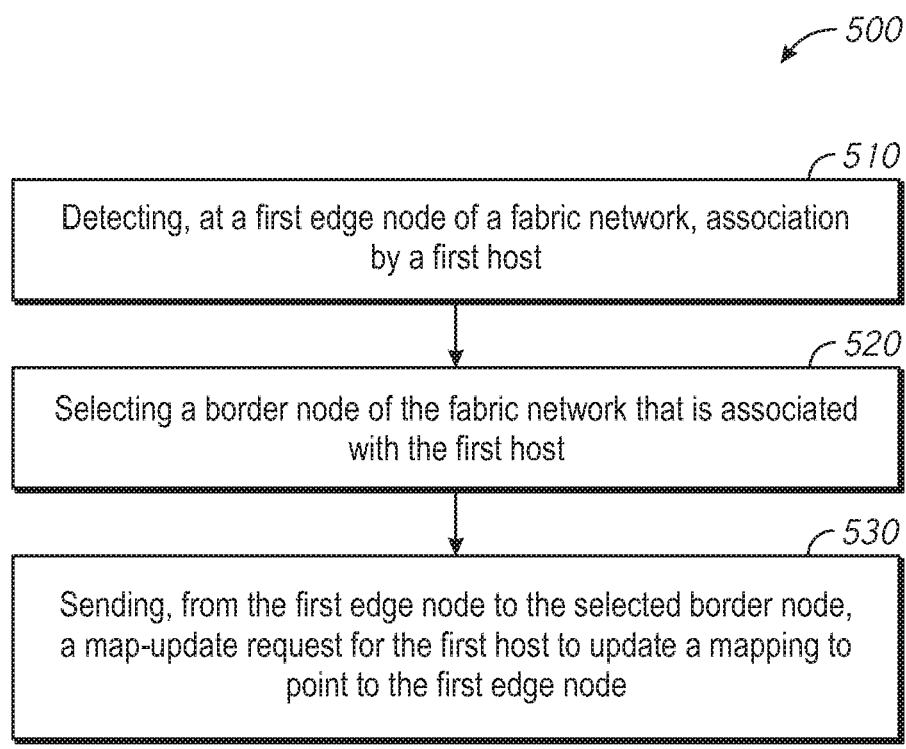
FIG. 5 is a flowchart representation of a method of updating a map in response to a detecting a host has moved in accordance with some implementations.

FIG. 5 is a flowchart representation of a method 500 of updating a map in response to a detecting a host has moved in accordance with some implementations. In some implementations (and as detailed below as an example), the method 500 is performed by an edge node of the fabric network, such as one of the edge nodes 120A-120C of FIG. 1, or a portion thereof. In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes detecting association by host, determining a partition to which the host is assigned, and sending, to a border node corresponding to the determined partition, a map-update request to update a mapping for the first host to point to the first edge node.

The method 500 begins, in block 510, with a first edge node of a fabric network detecting association by a first host. In various implementations, the first host transmits an association request to the first edge node and, in response, the first edge node transmits an association response confirming association with the first edge node.

The method 500 continues, in block 520, with the first edge node selecting a border node of the fabric network that is associated with the first host. In various implementations, the first edge node determines a partition associated with the first host, e.g., the partition to which the first host is assigned, and selects the border node of the fabric network that is associated with the partition (e.g., that provides map-server functionality for that partition). In order to determine the partition associated with the second host, in some embodiments, the first edge node inspects an endpoint identifier (EID) of the second host included in the association request (or other data) from the first host and determines the partition based on the EID. In various implementations, this includes parsing the EID to determine the partition. In one embodiment, the EID includes an instance identifier (IID) that identifies a Layer-2 segment. In one embodiment, the EID includes an IP address having a portion that identifies an IP subnet. For example, the EID may be "{IID=300, AB}:30.1.1.2" and the first edge node may determine the subnet as that with the IID of 300 and/or the segment as that with the IP network address of 30.1.1.0/24.

The method 500 continues, at block 530, with the first edge node sending, from the first edge node to the selected border node (through the fabric network), a map-update request for the first host to update a map to point to the first edge node. In various implementations, the map-update request includes the EID. In response to receiving the map-update request for the first host, the border node changes a map to indicate that the first host is connected to the first edge node (rather than a second edge node to which the first host may have previously been associated). In various implementations, the map includes entries only for those hosts associated with the partition. In response to the map-update request, in various implementations, the border node sends an update message to the second edge node (which the first host was previously associated) instructing the second edge node to remove the first host from its local cache (and, optionally, add the first host to its remote cache). In various implementations, the first edge node sends the update message to the second edge node.

Following the method 500 of FIG. 5, with reference to the fabric network environment 104 of FIG. 4, when the second host 130B moves from the coverage area of the first edge node 120A to the coverage area of the third edge node 120C, the following occurs. At block 510, the third edge node 120C detects association by the second host 130B. At block 520, the third edge node 120C selects the border node that is associated with the second host 130B (e.g., the third border node 110C). At block 530, the third edge node 120C sends a map-update request for the second host 130B to the third border node 110C to update a map (an example of which having been so updated is shown in Table 4) to point to the third edge node 120C (rather than the first edge node 120A to which the second host 130B was previously connected (e.g., in the fabric network environment 100 of FIG. 1)). In response, the third border node 110C changes an entry for the second host 130B to include reference to the third edge node 120C (rather than the first edge node 120A). In various implementations, the third border node 110C sends an update message to the to the first edge node 120A (which the second host 130B was previously associated) instructing the first edge node 120A to remove the second host 130B from a local cache (and, optionally, add the second host 130B to a remote cache).

TABLE 4

| EID | RLOC |
|---|---|
| (IID = 300, CA):30.1.1.1 | SW3 |
| (IID = 300, CB):30.1.1.2 | SW2 |

Figure 6:
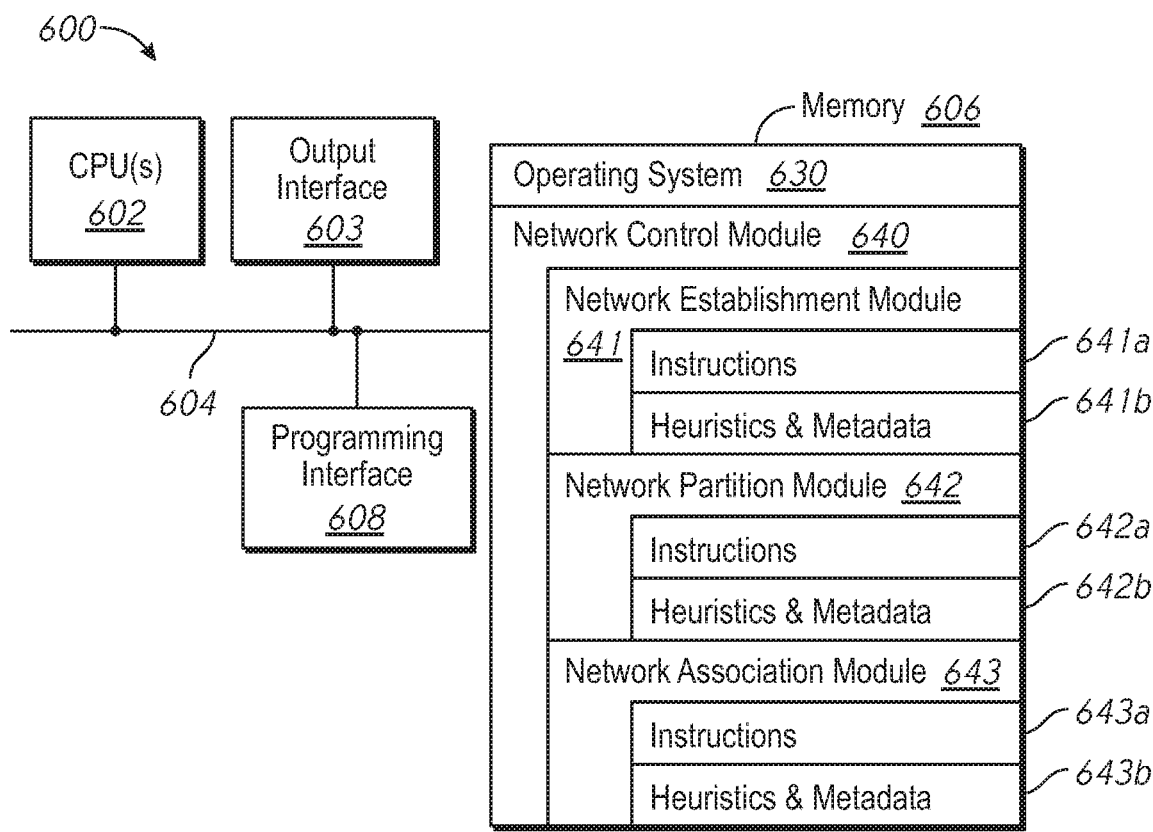
FIG. 6 is a block diagram of an example of a device in accordance with some implementations.

FIG. 6 is a block diagram of a computing device 600 in accordance with some implementations. In some implementations, the computing device 600 corresponds to the network controller 140, one of the edge nodes 120A-120C, and/or one of the border nodes 110A-110C of FIG. 1 and performs one or more of the functionalities described above with respect to those systems. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPU's) 602 (e.g., processors), one or more output interfaces 603 (e.g., a network interface), a memory 606, a programming interface 608, and one or more communication buses 604 for interconnecting these and various other components.

In some implementations, the communication buses 604 include circuitry that interconnects and controls communications between system components. The memory 606 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some implementations, the memory 606 or the non-transitory computer readable storage medium of the memory 606 stores the following programs, modules and data structures, or a subset thereof including an optional operating system 630 and a network control module 640. In some implementations, one or more instructions are included in a combination of logic and non-transitory memory. The operating system 630 includes procedures for handling various basic system services and for performing hardware dependent tasks. In some implementations, the network control module 640 is configured to establish, manage, and otherwise control a fabric network. To that end, the network control module 640 includes a network establishment module 641, a network partition module 642, and a network association module 643.

In some implementations, the network establishment module 641 is configured to establishing a fabric network including a plurality of border nodes to couple the fabric network to one or more external data networks and a plurality of edge nodes to couple to the fabric network to one or more hosts. To that end, the network establishment module 641 includes a set of instructions 641a and heuristics and metadata 641b. In some implementations, the network partition module 642 is configured to defining a plurality of partitions of the fabric network and register each of the plurality of partitions with a corresponding one of the plurality of border nodes and with each of the plurality of edge nodes. To that end, the network partition module 642 includes a set of instructions 642a and heuristics and metadata 642b. In some implementations, the network association module 643 is configured to detect association of a first host with a first edge node of the plurality of edge nodes and assign the first host to a first partition of the plurality of partitions. To that end, the network association module 643 includes a set of instructions 643a and heuristics and metadata 643b. In some implementations, the network association module 632 is further configured to transmit a map-update request for the first host to a corresponding first border node of the plurality of border nodes to cause the first border node to update a map to include an entry associating the first host with the first edge node Although the network control module 640, the network establishment module 641, the network partition module 642, and the network association module 643 are illustrated as residing on a single computing device 600, it should be understood that in other embodiments, any combination of the network control module 640, the network establishment module 641, the network partition module 642, and the network association module 643 can reside in separate computing devices in various implementations. For example, in some implementations, each of the network control module 640, the network establishment module 641, the network partition module 642, and the network association module 643 reside on a separate computing device.

Figure 7:
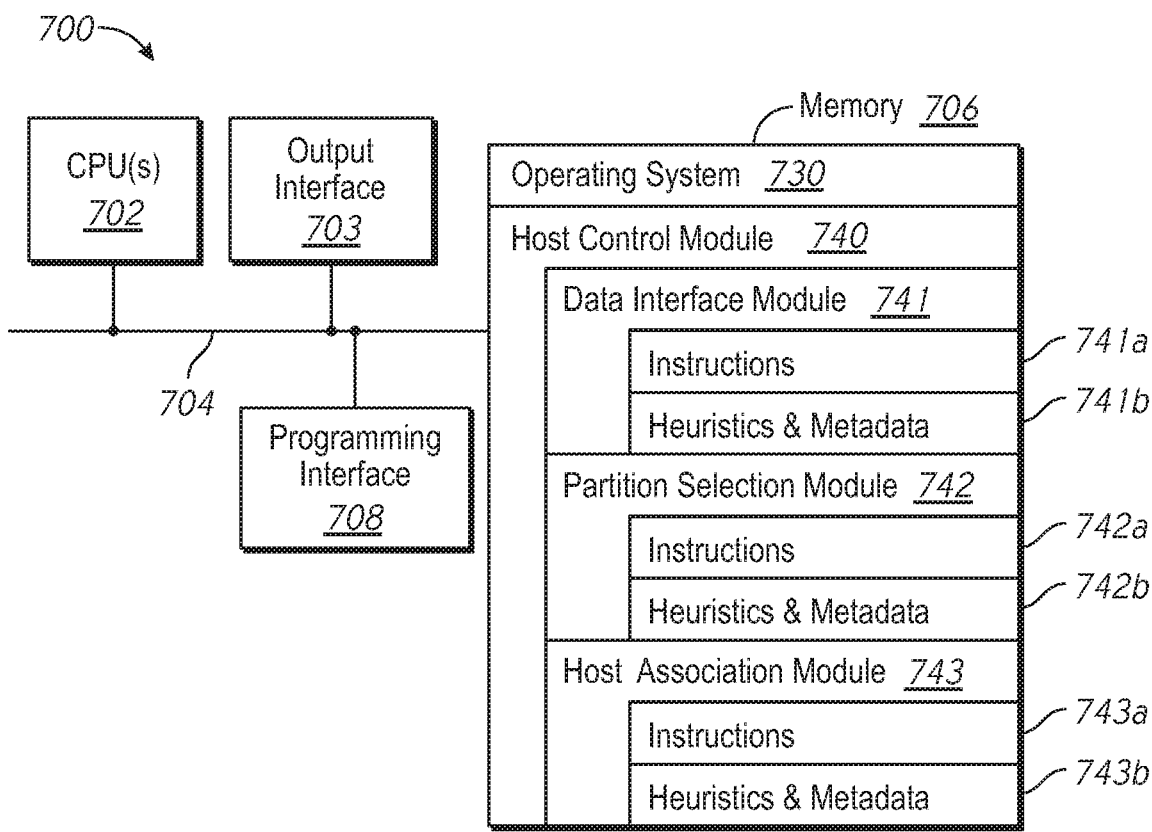
FIG. 7 is a block diagram of another example of a device in accordance with some implementations.

FIG. 7 is a block diagram of a computing device 700 in accordance with some implementations. In some implementations, the computing device 700 corresponds to the network controller 140, one of the edge nodes 120A-120C, and/or one of the border nodes 110A-110C of FIG. 1 and performs one or more of the functionalities described above with respect to those systems. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more output interfaces 703 (e.g., a network interface), a memory 706, a programming interface 708, and one or more communication buses 704 for interconnecting these and various other components.

In some implementations, the communication buses 704 include circuitry that interconnects and controls communications between system components. The memory 706 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some implementations, the memory 706 or the non-transitory computer readable storage medium of the memory 706 stores the following programs, modules and data structures, or a subset thereof including an optional operating system 730 and a host control module 740. In some implementations, one or more instructions are included in a combination of logic and non-transitory memory. The operating system 730 includes procedures for handling various basic system services and for performing hardware dependent tasks. In some implementations, the host control module 740 is configured to associate with and manage data from and to a host in a fabric network. To that end, the host control module 740 includes a data interface module 741, a partition selection module 742, and a host association module 743.

In some implementations, the data interface module 741 is configured to receive data from a first host addressed to a second host. To that end, the data interface module 741 includes a set of instructions 741a and heuristics and metadata 741b. In some implementations, the partition selection module 742 is configured to select a border node of the fabric network that is associated with the second host. To that end, the partition selection module 742 includes a set of instructions 742a and heuristics and metadata 742b. In some implementations, the data interface module 741 is further configured to send, to the selected border node, a map-request for the second host; receive, in response to the map-request, an indication of a second edge node associated with the second host; and send, to the second edge node, the data from the first host addressed to the second host.

In some implementations, the host association module 743 is configured to detect association by a first host. To that end, the host association module 743 includes a set of instructions 743a and heuristics and metadata 743b. In some implementations, the partition selection module 742 is further configured to select a border node of the fabric network that is associated with the first host. In some implementations, the data interface module 741 is further configured to send, to the selected border node, a map-update request to update a mapping for the first host to point to the first edge node Although the host control module 740, the data interface module 741, the partition selection module 742, and the host association module 743 are illustrated as residing on a single computing device 700, it should be understood that in other embodiments, any combination of the host control module 740, the data interface module 741, the partition selection module 742, and the host association module 743 can reside in separate computing devices in various implementations. For example, in some implementations, each of the host control module 740, the data interface module 741, the partition selection module 742, and the host association module 743 reside on a separate computing device.

Moreover, FIGS. 6 and 7 are intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIGS. 6 and 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    establishing a fabric network comprising a plurality of border nodes and a plurality of edge nodes, wherein the plurality of border nodes are coupled to one or more external data networks via a first network layer, and wherein the plurality of edge nodes are coupled to one or more hosts via a second network layer, the second network layer being different than the first network layer, and wherein the plurality of border nodes are connected to the plurality of edge nodes via an underlay network;
    partitioning the fabric network into a plurality of partitions, wherein each of the plurality of partitions of the fabric network comprises a border node of the plurality of border nodes, and wherein each of the plurality of partitions further comprises a network address and a control plane; and
    registering each of the plurality of partitions with the border node of the plurality of border nodes and with each of the plurality of edge nodes.

2. The method of claim 1, wherein a number of the plurality of partitions is the same as a number of the plurality of border nodes.

3. The method of claim 1, further comprising:
    detecting association of a first host with a first edge node of the plurality of edge nodes;
    assigning the first host to a first partition of the plurality of partitions;
    transmitting a map-update request for the first host to a corresponding first border node of the plurality of border nodes to cause the first border node to update a map to include an entry associating the first host with the first edge node.

4. The method of claim 3, wherein assigning the first host to a first one of the plurality of partitions is performed randomly, in a round-robin fashion, or according to policy heuristics.

5. The method of claim 3, wherein the entry includes an endpoint identifier (EID) of the first host and a resource locator (RLOC) of the first edge node.

6. The method of claim 3, wherein the map only includes entries for hosts assigned to the first partition.

7. The method of claim 1, further comprising announcing the plurality of partitions of the fabric network to one or more external networks.

8. The method of claim 1, wherein announcing the plurality of partitions includes announcing, by each of the plurality of border nodes, the corresponding one of the plurality of partitions.

9. A method comprising:
    establishing a fabric network comprising a plurality of border nodes and a plurality of edge nodes, wherein the plurality of border nodes are coupled to one or more external data networks, wherein the plurality of edge nodes are coupled to one or more hosts, and wherein the plurality of border nodes are connected to the plurality of edge nodes via an underlay network;
    partitioning the fabric network into a plurality of partitions, wherein each of the plurality of partitions comprises a border node of the plurality of border nodes, and wherein each of the plurality of partitions further comprises a network address and a control plane;
    registering each of the plurality of partitions with the border node and with each of the plurality of edge nodes;
    receiving, at a first edge node of the fabric network, data from a first host of the one or more hosts addressed to a second host of the one or more hosts;
    selecting the border node of the fabric network that is associated with the second host;

sending, from the first edge node to the border node, a map-request for the second host;

receiving, at the first edge node in response to the map-request, an indication of a second edge node associated with the second host; and sending, from the first edge node to the second edge node, the data from the first host addressed to the second host.

10. The method of claim 9, wherein selecting the border node of the fabric network that is associated with the second host includes:

determining a partition associated with the second host; and selecting the border node of the fabric network that is associated with the partition.

11. The method of claim 10, wherein determining the partition associated with the second host includes:

inspecting an endpoint identifier (EID) of the second host included in the data from the first host; and determining the partition based on the EID.

12. The method of claim 11, wherein determining the partition based on the EID includes:

parsing the EID to extract an instance identifier (IID) or IP address portion; and determining the partition based on the IID or IP address portion.

13. The method of claim 11, wherein the map-request for the second host includes the EID.

14. A method comprising:

establishing a fabric network comprising a plurality of border nodes and a plurality of edge nodes, wherein the plurality of border nodes are coupled to one or more external data networks, wherein the plurality of edge nodes are coupled to one or more hosts, and wherein the plurality of border nodes are connected to the plurality of edge nodes via an underlay network;

partitioning the fabric network into a plurality of partitions, wherein each of the plurality of partitions comprises a border node of the plurality of border nodes, and wherein each of the plurality of partitions further comprises a network address and a control plane;

registering each of the plurality of partitions with the border node and with each of the plurality of edge nodes;

detecting, at a first edge node of the fabric network, association by a first host of the one or more hosts;

selecting the border node of the fabric network that is associated with the first host;

sending, to the border node, a map-update request to update a mapping for the first host to point to the first edge node.

15. The method of claim 14, wherein selecting the border node of the fabric network that is associated with the first host includes:

determining a partition associated with the first host; and selecting the border node of the fabric network that is associated with the partition.

16. The method of claim 15, wherein determining the partition associated with the first host includes:

inspecting an endpoint identifier (EID) of the first host included in the data from the first host; and determining the partition based on the ED.

17. The method of claim 16, wherein determining the partition based on the HD includes:

parsing the EID to extract an instance identifier (IID) or IP address portion; and determining the partition based on the IID or IP address portion.

18. The method of claim 16, wherein the map-update request for the first host includes the ED.

19. The method of claim 14, further comprising sending, to a second edge node to which the first host was previously associated, an update message instructing the second edge node to remove the first host from a local cache of the second edge node.

20. The method of claim 19, wherein the update message further instructs the second edge node to add the first host to a remote cache of the second edge node.

* * * * *